United States Patent Office 3,409,264
Patented Nov. 5, 1968

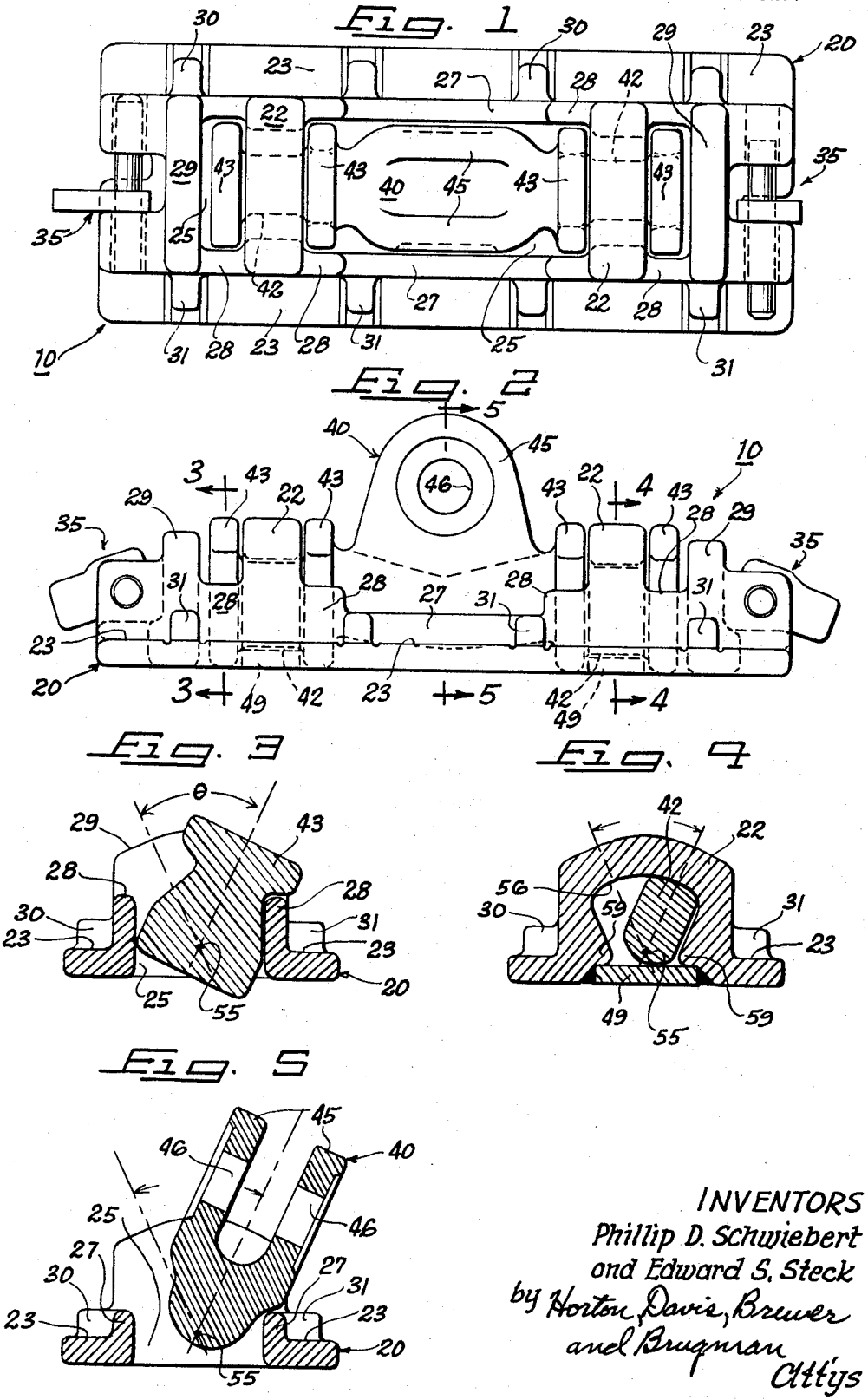

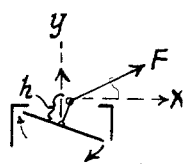
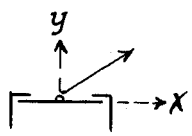
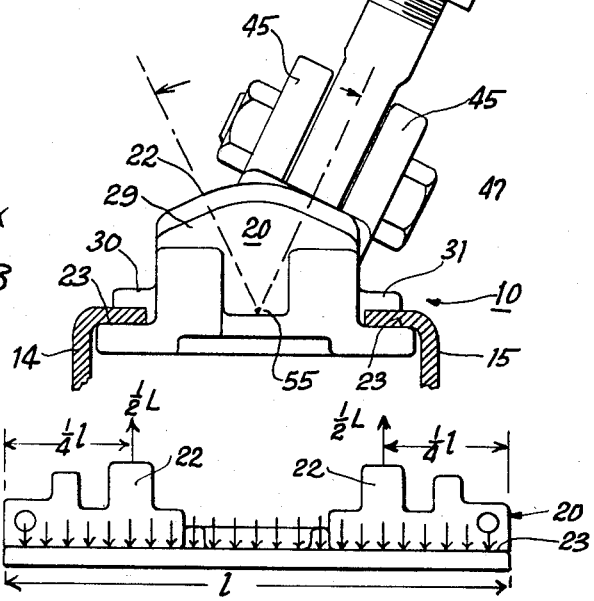
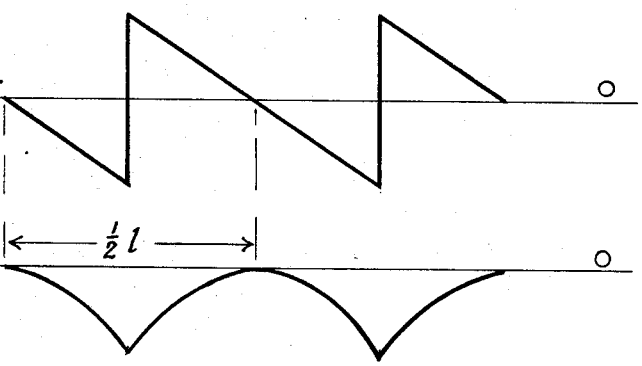

3,409,264
HEAVY DUTY LADING TIE-DOWN ANCHOR
Phillip D. Schwiebert, Glencoe, and Edward S. Steck, Chicago, Ill., assignors to MacLean-Fogg Lock Nut Company, Mundelein, Ill., a corporation of Delaware
Filed Sept. 29, 1966, Ser. No. 582,875
13 Claims. (Cl. 248—361)

ABSTRACT OF THE DISCLOSURE

An articulated tie-down anchor having a yoke journalled in a base on an axis in a plane at the mooring channel retaining flanges by shackles, at base quarter lengths, holding yoke trunnions with curved surfaces eccentric with respect to the axis.

This invention relates generally to a tie-down anchor, which is secured within an open mooring channel, and with more particularity, to a heavy duty lading tie-down anchor which equalizes bearing forces on the mooring channel retaining flanges.

Lading ties may be affixed to the bed of a freight carrier, such as a railroad flat car, or the like, by means of an anchor device which is secured between opposed retaining flanges of a mooring channel. The tie-down between the freight and the anchor is not always in a vertical plane, but very often is angled transversely with respect to the mooring channel. In the prior art anchor devices, this has resulted in an unequal distribution of bearing force, mainly upon one of the opposed retaining flanges of the mooring channel. For extremely bulky and heavy freight, it has been found that such an unequal distribution often results in severe damage, as the mooring channels may be buckled thereby.

The present invention envisions an anchor device having an articulated connection at a point wherein the bearing forces are equalized.

The invention herein achieves equal bearing force distribution in a heavy duty tie-down anchor in three ways. First, the anchor is articulated to assume the lading tie-down direction. Second, the articulation axis is at a plane through the mooring channel retaining flanges to minimize any twisting movement thereat. Third, the articulated joints are placed at the quarter length points of the base for minimum sheer and bending movement at the base midpoint allowing maximum and efficient mass placement of the heavy duty anchor.

Therefore, to overcome the foregoing and other difficulties of the prior art, the general object of this invention is to provide an improved anchor device suitable for extreme heavy duty use.

One of the objects of this invention is to provide a heavy duty lading tie-down anchor having an articulated connection therein.

Another object of this invention is to equalize the bearing force on the retaining flanges of a mooring channel to avoid any damage thereto by twisting and buckling.

A further object is the provision of a heavy duty anchor device having a yoke member pivoted therein about an axis proximate to a plane through the bearing surfaces of the anchor device.

It is still another object to provide an economical heavy duty lading tie-down anchor of durable and rugged construction having a minimum of easily fabricated parts, which are readily assembled and suitable for standard mass-production manufacturing techniques.

Further and other objects, and a more complete understanding of the invention may be had by referring to the following description and claims, taken in conjunction with the accompanying drawings in which:

FIG. 1 is a plan view illustrating the heavy duty lading tie-down anchor device of the present invention;

FIG. 2 is a side elevation of the anchor device shown in FIG. 1;

FIG. 3 is a cross-sectional view of FIG. 2, taken along the lines 3—3 in the direction of the arrows;

FIG. 4 is a cross-sectional view of FIG. 2 taken along the lines 4—4 in the direction of the arrows;

FIG. 5 is a cross-sectional view of FIG. 2 taken along the lines 5—5 in the direction of the arrows;

FIG. 6 is an end elevational view showing the invented anchor device connected to a lading tie-down turnbuckle and secured within a pair of opposed retaining flanges;

FIGS 7A and 7B are schematic diagrams illustrating the components of force and the resultant reactions on a tie-down anchor and retaining flanges;

FIG. 8 is a reduced side elevational view of the base of the anchor device, illustrating the load components exerted thereon;

FIG. 8A is a schematic diagram representing the shear forces exerted on the base of the anchor device by the load components of FIG. 8;

FIG. 8B is a schematic diagram representing the moment forces created in the anchor base by the load components of FIG. 8.

For the purpose of illustrating the invention, there is shown in the drawings a form which is presently preferred, it being understood, however, that this invention is not limited to the precise arrangements and instrumentalities there shown.

Referring now to the drawings in detail, wherein like numerals indicated like elements, there is shown in FIG. 1 an illustration of the heavy duty tie-down anchor of the present invention designated generally at 10. Essentially, the invented anchor device is of two components, forged or cast, of a suitable material for heavy duty use, to form a base 20 and a yoke member 40.

The base 20 has a cradle structure formed by the upright shackle elements 22, which project outwardly from the base, as illustrated. As may be best visualized with reference to the cross-section of FIG. 4, the shackle elements 22 are U-shaped and integral with the base 20. The base 20 also includes a flat surface 23 along both sides thereof, for bearing against the inside of each of the retaining flanges 14, 15, as shown best by the end view of FIG. 7. The entire central portion 25 of the base 20 is open, being separated from the flat surface 23 by an upright side wall 27. The upright side wall 27 is integrally formed with the base and defines the sides of the opening at the central portion 25. It is noted that the side wall 27 includes an extension 28 immediately on both sides of each of the shackle members 22, respectively. The opposite ends of the central opening through the base 20 are defined by the integral end walls 29. A plurality of teeth 30, 31 are integrally formed in the base and project at evenly spaced positions from the end walls 27 and flat surface 23, as shown. It is noted that the teeth 30, 31 are symmetric with respect to the shackle elements 22, that is, at equal positions on each side thereof, as shown. The teeth 30, 31 correspond to accommodating notches in the retaining flanges 14, 15, and are engaged therein to lock the anchor device at a desired longitudinal position with respect to the mooring channel. The anchor device 10 is then locked at a desired position by a gravity-biased lock mechanism shown generally at 35. The detail of the lock mechanism 35, as well as the cooperation between the teeth 30, 31 in notches of flanges 14, 15, are described fully in my co-pending application, Ser. No. 534,061, which is incorporated herein as a part of the present description.

An articulated connection to the base 20 is provided by the yoke member 40, which, as stated before, is a simple casting or forging of a sturdy and durable substance. The yoke member 40 is journalled on a pair of trunnions 42 in the cradle structure provided by the shackle elements 22. The trunnions 42 include integral collar portions 43 which are spaced to project at each side of the shackle elements 22 and thereby limit axial displacement of the yoke member 40 with respect to the base 20. With reference to FIG. 3, it is shown that the collar portions 43 have a particular cross-sectional shape for engagement with the extensions 28 of the side walls 27. In this manner, the angle of pivot θ is limited between extreme positions at either of the side wall extensions 28. The yoke member 40 includes a clevis 45 intermediate the trunnions 42. An eye 46 through the clevis 45 receives a pin or a bolt 47 therethrough, for connection to a lading tie-down turnbuckle 48, or the like, as may be best seen in FIG. 6.

It is noted that the pivot axis 55 of the trunnions 42 is eccentric with respect thereto and is at or proximate to a plane through the flat bearing surface 23, as may be best visualized with reference to the end views of FIGS. 3, 4, 5 and 6. Shackle elements 22 each have a curved inside bearing surface 56 which is defined by an arc concentric with the pivot axis 55. The portion of trunnions 42, contained within shackle elements 22, is of an oblong cross-sectional configuration with rounded corners and having an arcuate contact surface corresponding to the curved bearing surface 56. In this manner, the trunnions 42, although eccentric with respect to the pivot axis 55, are yet able to turn thereabout by a sliding contact along the curved inside bearing surface 56, as will be apparent by a visualization in view of the cross-section of FIG. 4.

The base 20 and the yoke member 40 are each separate integral castings or forgings and are assembled together by inserting the yoke member 40 through the open central portion 25 of the base 20. It may be readily appreciated that since the shackle elements 22 are open to the central opening 25, that assembly is readily accomplished. A retaining bar 49 is welded across the open portion of the base 20 at each of the shackle elements 22, as shown, to enclose each of the trunnions 42 and thereby contain the yoke member 40 within the shackle elements 22. In this manner, the yoke member 40 is journalled in the cradle structure of the base 20 to provide an articulated connection joint thereto having a pivot axis which is proximate or at the flat bearing surface 23.

The advantages of the invented anchor device may be appreciated best by reference to the schematic diagrams of FIGS. 7 through 8. FIGS. 7A and B schematically diagram the tie-down force components and resultant reactions on the anchor and mooring channel retaining flanges. In FIG. 7A the line of action of force F is through a point or axis separated by a distance $h$ from a plane through the contact surfaces of the anchor which bear against the inside of the retaining flanges. As is well known, the tie-down force F may be resolved into horizontal and vertical components, $x$ and $y$, respectively. The distance $h$ is acted upon by horizontal component $x$, as a lever, tending to produce a moment in the direction indicated by the arrows. As a result, the entire vertical component, as well as the moment force, must be borne by a single retaining flange, in the example of 7A, the left flange. FIG. 7A is typical of the prior art, while FIG. 7B diagrams the anchor of the present invention. In FIG. 7B the line of action of tie-down force F is through a point in a plane through the anchor contact bearing surface. The horizontal component of force $x$, in this case, is not separated from the contact bearing plane, thus there is no lever or resultant moment tending to turn the anchor. The only bearing force present is that of the vertical component $y$, which acts at the midpoint of the anchor and flanges and thus is equally distributed therebetween. In this manner, the full strength capabilities of the mooring channel may be utilized without damage thereto.

Although the relatively large central opening at 25 through the base facilitates assembly of the yoke therein, it must also be recognized that this configuration presents a weak central section. This problem is solved in the invented anchor base by locating the shackle elements 22 at the points corresponding to ¼ of the base length 1 from each end. In this regard, the base is equivalent to a uniformly loaded beam supported at two points. The uniform load L is represented in FIG. 8 by the plurality of downward arrows on the bearing surface 23 of the base 20, while the support points ½L are provided by the shackle elements 22. The shear and bending moment diagrams for a uniformly loaded beam, corresponding to base 20 of FIG. 8, are represented by FIGS. 8A and 8B. Location of the support points, each carrying ½ of the uniform load, at the ¼ length points, means that there is zero shear and bending moment at the midpoint, as evidenced by the diagrams. Therefore, a weak center section is of no concern. On the other hand, maximum shear and bending moment occurs at the ¼ length points, and therefore, it is important that these points be reinforced. Reinforcement has been provided by the extension portions 28 of side walls 27, the retaining bars 49, and thickened portions 59 of the shackle elements 22. In this manner the maximum mass of the anchor is provided where most efficiently utilized for a rugged and durable heavy duty loading tie-down anchor.

The present invention may be embodied in other specific forms without departing from the spirit or potential attributes thereof and, accordingly, reference should be made to the appended claims, rather than to the foregoing specification as indicating the scope of the invention.

We claim:

1. A lading tie-down anchor for securement within a pair of opposed retaining flanges of a mooring channel, comprising: an anchor base to fit within said channel, said base including a cradle structure and having a flat surface for bearing against the inside of each of said retaining flanges; and a yoke member journaled in said cradle structure on a pair of trunnions having a pivot axis in a plane at said retaining flanges, said yoke providing an articulated tie-down connection to said base whereby tie-down forces are exerted in a direction defined by a line of action passing through said axis to equalize bearing forces on each of said flanges for all positions of said yoke.

2. A lading tie-down anchor in accordance with claim 1, wherein said pivot axis is at said plane passing through said flat surface.

3. A lading tie-down anchor in accordance with claim 1, wherein said pivot axis is in a plane containing the longitudinal center line of said base.

4. A lading tie-down anchor in accordance with claim 1, wherein said cradle structure is formed by a pair of spaced shackle elements projecting outward from said base and being integral therewith, said shackle elements containing said trunnions and providing bearings therefor.

5. A lading tie-down anchor in accordance with claim 4, wherein said base has a central opening therethrough communicating with said cradle structure, said shackle elements being open thereto, for an assembly of said yoke member therein.

6. A lading tie-down anchor in accordance with claim 5, including a retaining bar affixed in said base across said opening to retain said yoke member within said shackle elements of said cradle structure.

7. A lading tie-down anchor in accordance with claim 6, wherein said retaining bar is one of a pair, each welded to said base at one of said shackle members to enclose said trunnions thereat.

8. A lading tie-down anchor in accordance with claim 4, wherein said shackle elements of said cradle structure are at a ¼ point of the length of said base to present minimal shear and bending moment at the mid-point of said length.

9. A lading tie-down anchor in accordance with claim 8, wherein said yoke member includes a clevis intermediate said trunnions, said clevis providing a central tie-down connection.

10. A lading tie-down anchor in accordance with claim 4, wherein said shackle elements each have a curved inside bearing surface defined by an arc concentric with said pivot axis, said trunnions being eccentric with respect to said pivot axis, yet able to turn thereabout by a sliding contact along said curved inside bearing surface.

11. A lading tie-down anchor in accordance with claim 10 wherein said trunnions are of an oblong cross-sectional configuration with rounded corners and having an arcuate contact surface corresponding to said curved inside bearing surface of said shackle elements.

12. A lading tie-down anchor in accordance with claim 5, wherein each of said trunnions includes integral collar portions on each side of a respective one of said shackle elements to limit axial displacement of said yoke member with respect to said base.

13. A lading tie-down anchor in accordance with claim 11, wherein said central opening opposite each of said collar portions is defined by side walls integral with said base, said collar portions having a cross-sectional shape for engagement with said side walls at extreme pivot positions of said yoke member, to thereby limit at a desired degree the angle of pivot between said extreme positions.

References Cited

UNITED STATES PATENTS 3,212,457   10/1965   Looker _____ 105—369

ROY D. FRAZIER, *Primary Examiner.*

F. DOMOTOR, *Assistant Examiner.*